US008671436B2

(12) United States Patent
Schlack (10) Patent No.: US 8,671,436 B2
(45) Date of Patent: Mar. 11, 2014

(54) DYNAMIC SERVICE GROUP DISCOVERY (75) Inventor: John Schlack, Quakertown, PA (US)

(73) Assignee: Beaumaris Networks Inc., Boxborough, MA (US)

( * ) Notice: Subject to any disclaimer, the term of this patent is extended or adjusted under 35 U.S.C. 154(b) by 241 days.

(21) Appl. No.: 12/956,236

(22) Filed: Nov. 30, 2010

(65) Prior Publication Data

US 2011/0131625 A1   Jun. 2, 2011

Related U.S. Application Data (60) Provisional application No. 61/265,470, filed on Dec. 1, 2009.

(51) Int. Cl.
  *H04N 7/173* (2011.01)
  *H04H 20/28* (2008.01)
  *H04J 1/00* (2006.01)

(52) U.S. Cl.
  USPC .......................... 725/116; 725/118; 370/486

(58) Field of Classification Search
  None
  See application file for complete search history.

(56) References Cited

U.S. PATENT DOCUMENTS

| 7,246,366 B1 * | 7/2007 | Addington et al. ............. 725/93 |
| 2003/0074441 A1 | 4/2003 | Penk et al. |
| 2003/0199246 A1 * | 10/2003 | Friedman et al. ............. 455/3.01 |
| 2004/0158867 A1 | 8/2004 | Mack et al. |
| 2005/0039213 A1 | 2/2005 | Matarese et al. |
| 2005/0120377 A1 | 6/2005 | Carlucci et al. |
| 2005/0163060 A1 | 7/2005 | Riley et al. |
| 2005/0249130 A1 * | 11/2005 | Schutte et al. ................. 370/254 |
| 2006/0171390 A1 * | 8/2006 | La Joie ........................ 370/390 |
| 2007/0153820 A1 * | 7/2007 | Gould ........................... 370/432 |
| 2008/0273548 A1 | 11/2008 | Leano et al. |
| 2009/0055880 A1 * | 2/2009 | Batteram et al. .............. 725/100 |

FOREIGN PATENT DOCUMENTS

| WO | WO 01/97507 | 12/2001 |
| WO | WO2011/068802 | 6/2011 |

OTHER PUBLICATIONS

International Search Report mailed Feb. 9, 2011 in corresponding International Application No. PCT/US2010/58419.
PCT Jun. 5, 2012 International Preliminary Report on Patentability and Written Opinion from International Application No. PCT/US2010/58419.
EPO Aug. 13, 2013 Search Report and Opinion from European Application Serial No. 10835009.
Aaby, Cliff, "Arris (C-COR) Switched Digital Video (SDV) Training," Training Presentation at The Greater Chicago Chapter of the SCTE, Jan. 31, 2008, 48 pages http://www.gcscte.org/presentations/2008/Switched_digital_201-Abee-ARRIS-018108.pdf.
Ghiz, Scott, "Switched Digital Video Solution—Motorola SDV Solution," Presentation at the Delaware Valley Appalachian Chapter of the SCTE, Feb. 14, 2008, 53 pages http://dvac-scte.org/presentations/2.14.08_SDV/SDV101_Motorola.ppt‎.

* cited by examiner

*Primary Examiner* — Nathan Flynn
*Assistant Examiner* — William J Kim
(74) *Attorney, Agent, or Firm* — Patent Capital Group (57) ABSTRACT A dynamic service group discovery and mapping approach avoids manual assignment of stream channels for transporting video services to the client devices that provide the video services to an end user. Client devices, such as set-top boxes, receive video services such as video on demand (VOD), switched digital video (SDV), pay-per view (PPV) and other narrowcast types of video for selective transmission. Each client device scans for visible stream channels, and sends a report indicative of visible stream channels to a dynamic mapping server. The dynamic mapping server applies aggregation rules for determining, based on the reported stream channels, which client devices are in the same service group. By receiving reports from each client device, the dynamic mapping server identifies groupings of service groups by combining sets of client devices receiving common channels, and "builds" the service groups as additional reports indicate common stream channels visible to multiple set top boxes.

22 Claims, 8 Drawing Sheets

DYNAMIC SERVICE GROUP DISCOVERY

RELATED APPLICATIONS

This application claims priority to and the benefit under 35 U.S.C. §119(e) of U.S. Provisional Patent Application No. 61/265,470, filed Dec. 1, 2009, entitled "DYNAMIC SERVICE GROUP DISCOVERY," the contents of which is hereby incorporated by reference in their entirety.

BACKGROUND

Network transmission of video services, such as cable television, video on demand (VOD), and video file downloads continue to proliferate as the network infrastructure continues to evolve to support the high bandwidth demands of applications providing such services. Such a network infrastructure includes headends for providing video services, service nodes for executing applications for delivering the video services, and set-top boxes or other user device for rendering the service to users. The network arranges the set-top boxes into service groups, which are collections of set-top boxes served by a common set of connections emanating from the head end and terminating at the service groups. Typically, each of the set-top boxes is disposed in geographic proximity to others in the group, and the connections defined by physical coaxial cable (coax) runs that branch out to the various service groups. While generally available programming (i.e. basic cable) is typically available to all set top boxes, in a so-called "broadcast" transmission, other services such as video-on-demand are sent to individual set-top boxes on "narrowcast" channels.

Each service group is allocated a predetermined number of narrowcast lines for satisfying the narrowcast demand (i.e. VOD) in the service group. In a conventional video services network, each of the set-top boxes receives particular channels, or frequency ranges, for narrowcast video services, generally based on the physical arrangement of the delivery infrastructure connections that branch to different service groups. These frequency ranges, or channels, are thus "visible" to the set top box, and are common to all set-top boxes in the service group. A "channel" is typically a 6 MHz frequency range (8 MHz in Europe). Each "channel" has a certain bandwidth depending on the modulation of the signal it carries, typically modulated using Quadrature Amplitude Modulation (QAM) or similar variant The headend maintains a mapping of set-top boxes to service groups, and further maps each service group to the channels, or frequency ranges, applicable to the group. Thus, when a user requests a service, the headend identifies the set-top box making the request, and identifies the service group and channels assigned to that group for transmitting the service.

SUMMARY

In a conventional video services network providing narrowcast transmissions, manual mapping of service groups to narrowcast channels identifies the channels upon which to transmit video services (services). Manual mapping employs operator entry of a client device identity, such as a set-top box ID, the service group, and the corresponding narrowcast channels. Operator error results in transmission of the requested service on a channel unavailable at the expected set-top box. Semi-automatic discovery allows set-stop boxes to scan possible frequency bands to identify available channels, and transmit the visible channels to the headend. Exhaustive scanning, however, is time-consuming and is still subject to operator error if an improper network connection is made in the transmission lines intended for a particular service group.

A dynamic service group discovery and mapping approach avoids manual configuration and assignment of stream channels for transporting video services to the client devices (i.e. settop boxes) that recognize and receive the stream channels for providing the video services to an end user on a rendering device, typically a TV or other video display. Client devices, such as set-top boxes, receive video services such as video on demand (VOD), switched digital video (SDV), pay-per view (PPV) and other narrowcast types of video for selective transmission to specific client device (in contrast to broadcast transmissions received by all users). Client devices are configured to receive a subset of available stream channels, typically a 6 MHz or 8 MHz band referred to as a QAM (Quadrature Amplitude Modulation, referring to encoding performed on the stream), based on physical network configuration and the customer premises location of the client device. Each client device scans for visible stream channels upon which video service may be received, and sends a report indicative of visible stream channels to an automatic discovery server. The automatic discovery server applies aggregation rules for determining, based on the reported stream channels, which client devices are in the same service group. By receiving reports from each client device, the dynamic mapping server identifies groupings of service groups by combining sets of client devices receiving common channels, and "builds" the service groups as additional reports indicate common stream channels visible to multiple settop boxes.

Configurations herein are based, in part, on the observation that conventional approaches to service group mapping of stream channels such as QAMs to the client devices (i.e. set top boxes) that serve them is a manual configuration effort prone to operator/installer error and cumbersome diagnostics since the assignment is based on physical wiring of service groups from a subset of available frequency ranges that service each particular service group.

Unfortunately, conventional approaches to mapping client devices such as set top boxes to service groups and the QAMs that serve them suffer from the shortcoming of incorrect mappings, burdensome diagnostics, and/or sluggish configurability. Configurations herein substantially overcome the above-described shortcomings by providing a dynamic service group discovery approach that receives a report of visible QAMs from the set-top boxes resulting from a scan of available frequency bands. A discovery server receives the reports from each of the set-top boxes, and computes service groups of set-top boxes by identifying set-top boxes receiving the same set of QAMs. Gaps or omissions in the visible frequency reports (reports) are accommodated by aggregation rules that identify set of set-top boxes with common visible QAMs and combining subgroups of QAMs, since each service group receives the same set of QAMs (stream channels) and each QAM services only a single service group.

One conventional method of associating settops to service groups is to manually configure the settop to service group mapping and the QAM to service group mapping. Given a particular settop, the service group and associated narrowcast QAMs are known by the application server. This is time consuming and error prone work. Additionally, an installer typically does not know the service group of a particular subscriber location.

Another method for service group assignment is to broadcast a conventional data stream on each narrowcast QAM. The data stream can carry the service group ID. The settop box is configured with the frequencies of the narrowcast QAMs. The settop box tunes to the data stream on a narrowcast QAM and extracts the service group ID and uses this information when invoking services. This method still requires manual configuration of the narrowcast QAM to service group mapping. Errors can occur in both data entry and wiring. An incorrect service group value could be entered for a particular QAM, thus each QAM in a service group may identify the service group with a different ID.

Another conventional method for service group discovery is TSID-based auto discovery. Stream channels generally occupy a 6 MHz or 8 MHz range for QAM transport, often identified by an MPEG transport stream ID (TSID). In this conventional approach each narrowcast QAM is assigned a unique TSID. The settop box is configured with the frequencies of the narrowcast QAMs. Each settop box scans the frequencies for the set of TSIDs for the narrowcast QAMs and reports these TSIDs either to a central server or when requesting service delivery. By delivering a service only on a QAM with a TSID reported by the settop, the application server will deliver the service to the settop and bypass wiring problems. This approach, however, limits the network to delivering video services only on the QAMs discovered by the set top box. Since QAM scanning is a slow process and on many occasions only a subset of QAMs will be discovered for that service group, service delivery is limited to a subset of narrowcast QAMs assigned to that service group.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of automatic discovery in a video services environment. Typically a user employs a customer premises equipment (CPE) client device such as a settop box for requesting a video service. The settop box has been previously designated as a member of a particular service group based on the stream channels allocated to serve the service group. The stream channels each represent a portion of bandwidth allocated for narrowcast transmissions such as video services, and are generally allocated in groups of 4, 6 or 8 stream channels per service group, depending on expected demand. Each stream channel can support a predetermined number of video services, depending on attributes such as HD or standard video and the encoding format of the stream data (such as MPEG-2 or H.264), and is shared by all settop boxes in the service group. In the example depicted below, each stream channel represents a 6 MHz bandwidth portion employing Quadrature Amplitude Modulation, or QAM, and is assigned a TSID (Transport Stream Identifier) referring to available MPEG transport streams.

A service group is a set of settop boxes or consumer premise equipment (CPE) that receive video, audio, and data through the same set of narrowcast QAMs. This document uses the term settop or settop box to refer to settop boxes, CPE devices, or client devices of any type.

Each service group can be identified using a unique ID, which may be a name or number. The term narrowcast means that the service is broadcast to a small subset of the overall settop box population. For example, a service group may consist of 1000 settop boxes out of 200,000 settop boxes in a particular headend.

When delivering services over a narrowcast QAM, the application server needs to know which set of narrowcast QAMs reach a particular settop so that it can direct service delivery over one of those narrowcast QAMs. Otherwise, the settop box will not be able to receive the service.

Using dynamic service group discovery as disclosed herein, the system is not configured with a predetermined TSID to service group mapping or a QAM to service group mapping. Instead, a discovery server automatically builds the TSID/QAM to service group mappings by aggregating TSID data reported by all settop boxes. The settops scan the frequencies of the narrowcast QAMs to discover the TSIDs of those QAMs. The TSIDs are reported to the centralized automatic discovery server or to an application server when requesting a service.

Figure 1:
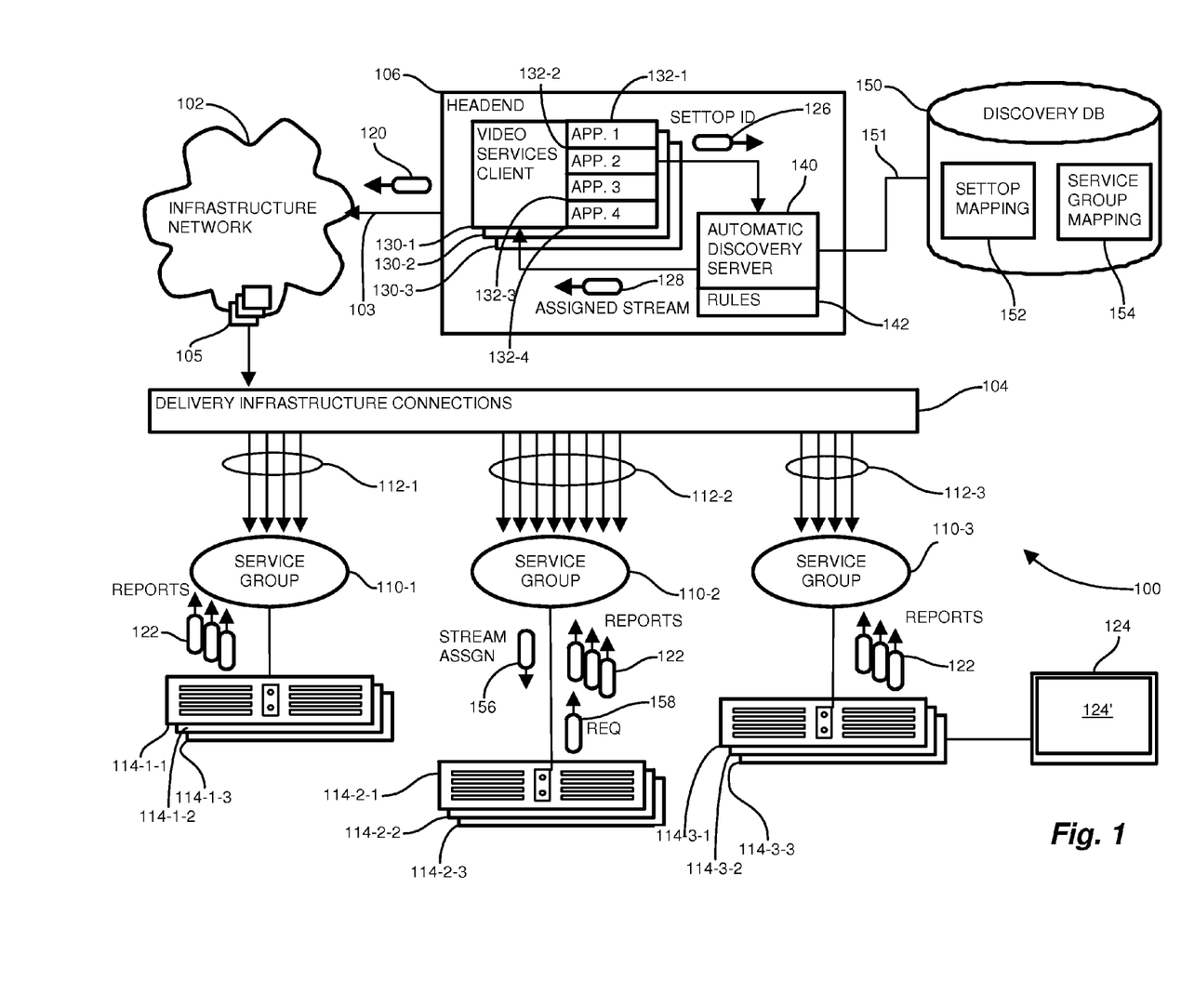
FIG. 1 is a context diagram of a video services environment suitable for use with configurations herein.

FIG. 1 is a context diagram of a video services environment 100 suitable for use with configurations herein. Referring to FIG. 1, a video services environment 100 includes a headend 106 and an infrastructure network 102 with delivery infrastructure connections 104 to individual service groups 110-1 . . . 110-3 (110 generally), and a discovery interface 103. The infrastructure network 102 may be any suitable transport network, such as Internet connections, fiber optic connections, TELCO lines and broadband lines, or a combination of these, usually employing a combiner 105 for bundling transmissions to multiple service groups 110. For each service group 110, the combiner 105 aggregates the broadcast QAMs and narrowcast QAMs for a given service group into a single RF stream; there may also be separate mechanisms for delivering many RF streams for the different service groups 110-N over the infrastructure transport network 110. The combiner 105 or other high bandwidth mechanism in the infrastructure network 102 transports a plurality of stream channels 112 emanating from the headend 106 for transport to the client devices 114 (e.g. settop boxes) for rendering the service 120. The transport network 102/104 connects to particular service groups 110 by connecting transport streams 112 of a particular bandwidth range to the client devices 114 of a particular service group 110. The delivery infrastructure connections 104 define a service drop to individual client devices such as settop boxes 114-1-1 . . . 114-3-3 (114 generally) or other CPE device, typically via a fanning out of coaxial cable to homes of individual users.

Employing the above described transport through the network 102 and connections 104, the client devices 114 receive a combined signal for a single RF stream carrying all broadcast and narrowcast channels for a given service group 110. Different transport mechanisms (e.g. 102, 104) to the service groups 110 may exhibit various method for carrying these RF signals—whether it is a different wavelength of light on a fiber optic line or different fiber optic lines. Service group discovery and mapping as disclosed herein identifies the stream channels 112 received by each service group for these narrowcast channels (e.g. 6 MHz bands), thus each service group 110 is connected to a predetermined set of frequencies, or stream channels 112-1, 112-2, 112-3 (112 generally), respectively, for delivering video services 120 to the service group 110. Stream channels 112 outside the range delivered to the service group 110 may not be available to the settop boxes 114.

Each service group 110 can be identified using a unique ID, which may be a name or number (180, FIG. 4 below). The term "narrowcast" implies that the service 120 is broadcast to a small subset of the overall settop box population (i.e. VOD, rather than basic cable). For example, a service group may consist of 1000 settop boxes out of 200,000 settop boxes in a particular headend. When delivering services over a narrowcast QAM, the application server needs to know which set of narrowcast QAMs reach a particular settop (e.g. client device 114) so that it can direct service delivery over one of those narrowcast QAMs 112. Otherwise, the settop box will not be able to receive the service. Therefore, the headend 106 selects a stream channel 112 corresponding to the service group 110 of the settop box 114 that is to receive the video services 120. The number of stream channels 112 per service group 110 is predetermined based on expected demand. The headend 106 combines these narrowcast frequencies for a given service group 110 with the broadcast frequencies available to all service groups to produce the combined signal to deliver to a specific service group.

In operation, a user issues a request 158 for video services, typically using a video display 124 and remote in conjunction with a menu 124' driven by the settop box 114. The headend 106 receives the request 158 at a video services client 130-1 . . . 130-3 (130 generally), which launches or invokes an application 132-1 . . . 132-4 for providing the requested service. The application 132 invokes an automatic discovery server 140 using a settop ID 126 from the request 158, indicative of the requesting settop box 110. By configurations disclosed further below, the discovery server 140 issues a request via a discovery interface 151 to a discovery DB 150 that identifies the service group 110 and corresponding stream channels 112 receivable by the settop box 114. The discovery DB 150 includes a settop mapping 152 that identifies the service group 114 corresponding to a particular settop box 110, and a service group mapping 154 that identifies discovered stream channels 112 for the service group 114. The discovery server 140 returns an assigned stream channel 128, such as a TSID, which indicates a frequency range, or QAM, receivable by the settop box 114. The video services client 130 transmits a stream assignment 156 to the settop box 114 to indicate to the settop box 114 which stream channel 112 to listen on, and transmits the requested service 120 using the assigned stream channel 128.

Unlike TSID Based Auto Discovery, there is no manually configured table to map a TSID or QAM to a service group. Instead, the auto discovery server 140 searches TSID reports 122 from other settop boxes 114 to assign a service group 110. If a set of frequency/TSID pairs reported by this settop exactly match those reported by other settops 114, then the auto discovery server 140 assigns the same service group 110 to all of the settops 114 that report the same frequency/TSID pairs. If a set of frequency/TSID pairs reported by this settop contain some, but not all, matching entries with those reported by other settops, then the auto discovery server 140 combines the frequency TSID pairs into a new service group 110. If the frequency/TSID pairs reported by the settop do not overlap values reported by other settop boxes, then the auto discovery server 140 assigns a new service group 110 to the set of frequency/TSID pairs. As more settop boxes 114 report the TSIDs from the narrowcast QAMs, the auto discovery server 140 dynamically builds the TSID to service group mapping table 154 and corresponding settop mapping 152 in the discovery DB 150, discussed further below with respect to FIGS. 5-8.

Conventional approaches rely on manual entry of at least the stream channel 112 or service group 110 leading to the service drop of the CPE or settop box 114, exposing vulnerabilities due to either mis-wiring the delivery infrastructure connections 104 to the service drop (i.e. coax cable) to the customer house or improper entry of the service group 110 in which that settop box 114 resides. Automatic discovery as disclosed further below allows the settops 114 to scan available stream channels 112 and send reports 122 indicative of the visible (available) stream channels that the settop 112 is receiving.

For automatic discovery and population of the discovery DB 150, the automatic discovery server 140 receives reports 122 from each of the settops 114 indicative of the visible stream channels 112. Since scanning of stream channels 112 by the settops 114 may involve a time lag to completely scan and report 122 all visible channels, the automatic discovery server 140 employs the observation that all settops in a service group receive the same set of stream channels 112. Therefore, inferences may be made from partial reports (less than all stream channels 112 in the group) to identify settops 114 in the same service group 110, since all settops in the group 110 share the same set of stream channels. In an ideal network, where reports 122 of stream channels 112 are entirely accurate, a single common stream channel 112, or overlap, would be deemed sufficient to construe that the settops 112 share the same service group 110. In practice, anomalies such as line noise and misconfiguration may result in an inaccurate report of a single stream channel. Therefore an overlap threshold, indicative of the number of common channels taken to imply a common service group 110, is employed. In the example below, an overlap threshold of two is employed (i.e. settops reporting at least two stream channels in common are construed to be in the same group), however this parameter may be tuned to suit the transmission characteristics of a particular network.

In the example arrangement shown, one rule is based on an "overlap" threshold in the visible TSIDs (QAMs) that can be seen by the set top box—that is, the set of TSIDs common to different set top boxes. The threshold acknowledges that an indication of a single common TSID might be only an anomaly, but an overlap of two or more is indicative of a common service group 110. Similarly, exhaustive overlap (i.e. all 4 QAMs are reported by set top boxes are matching) might be too restrictive as it might take some time for some set top boxes to accurately report the full set of QAMs available.

Returning to FIG. 1, upon receiving reports 122 of visible stream channels 112, the discovery server 140 aggregates and coalesces the stream channels 112 to identify common channels according to aggregation rules 142. The aggregation rules 142 specify when a grouping of settops reporting the same stream channels 112 may be combined with another grouping of settops having an overlapping number of stream channels. Each report 122 includes the identity of the settop (settop ID) and the stream channels it "sees," or has scanned as a receivable stream channel. The service group mapping 154 aggregates each report 122 as an entry, and compares it to other reports 122 already received. An initial service group ID is assigned, indicating the stream channels from the report, discussed further below, depending on the other entries already aggregated. The settop mapping stores the service group ID with the settop ID so that the service group of a settop 114 may be obtained to service a request, and the requested service transmitted on a stream channel 112 corresponding to that service group 110. Subsequent reports 122 may result in addition of new service groups identifiers or combinations with existing service groups as new settop 114 are added. Upon receipt of all reports, 122, combinations of service group mappings ultimately aggregate all the settops in the service groups by identifying commonly received stream channels, and the service group ID remains for responding to subsequent service requests 158.

Figure 2:
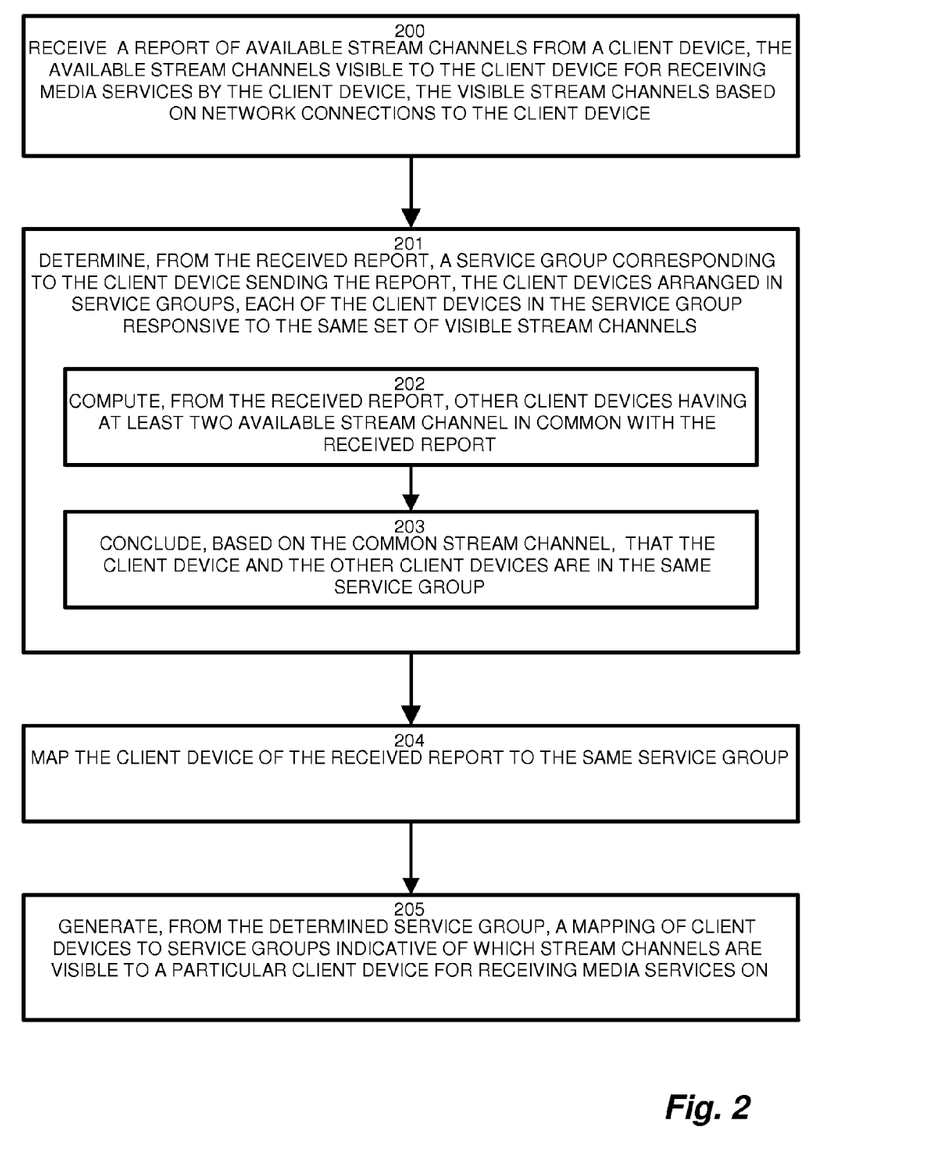
FIG. 2 is a flowchart of dynamic service group discovery in the environment of FIG. 1.

FIG. 2 is a flowchart of dynamic service group discovery in the environment of FIG. 1. Referring to FIGS. 1 and 2, in the video delivery environment 100 having a plurality of stream channels 112 for delivering media services 120 to client devices (settops 114) responsive to the delivered media for rendering on a user device 124, the method of discovering transmission resources as disclosed herein includes, at step 200, receiving a report 122 of available stream channels 112 from the client device 114, in which the available stream channels 112 are visible to the client device 114 for receiving video and other media services 120 by the client device 114, such that the visible stream channels 112 are based on network connections 104 to the client device 114. The automatic discovery server 140 (discovery server) determines, from the received report 122, the service group 110 corresponding to the client device 114 sending the report 122, in which the client devices 114-n are arranged in service groups 110, such that each of the client devices 114 in the service group 110 is responsive to the same set of visible stream channels 112 as the other members (settops) of the group, as disclosed at step 201.

Using the report 122, the discovery server 140 computes other client devices 114 having at least two available stream channels 112 in common with the received report 122, as depicted at step 202. The discovery server 140 therefore concludes, based on common stream channels 112, that the client device 114 and the other client devices 114-n are in the same service group 110, as disclosed at step 203, and maps the client device 114 of the received report 122 to the determined same service group 110 for storing in the discovery database (DB) 150, as depicted at step 204. Upon receiving multiple reports 122 from some or all of the settops 114, the discovery server 140 generates, from the determined service group 110, a mapping of client devices 114 to service groups 110 indicative of which stream channels 112 are visible to a particular client device 114 for receiving media services 120 on, as shown at step 205.

Figure 3:
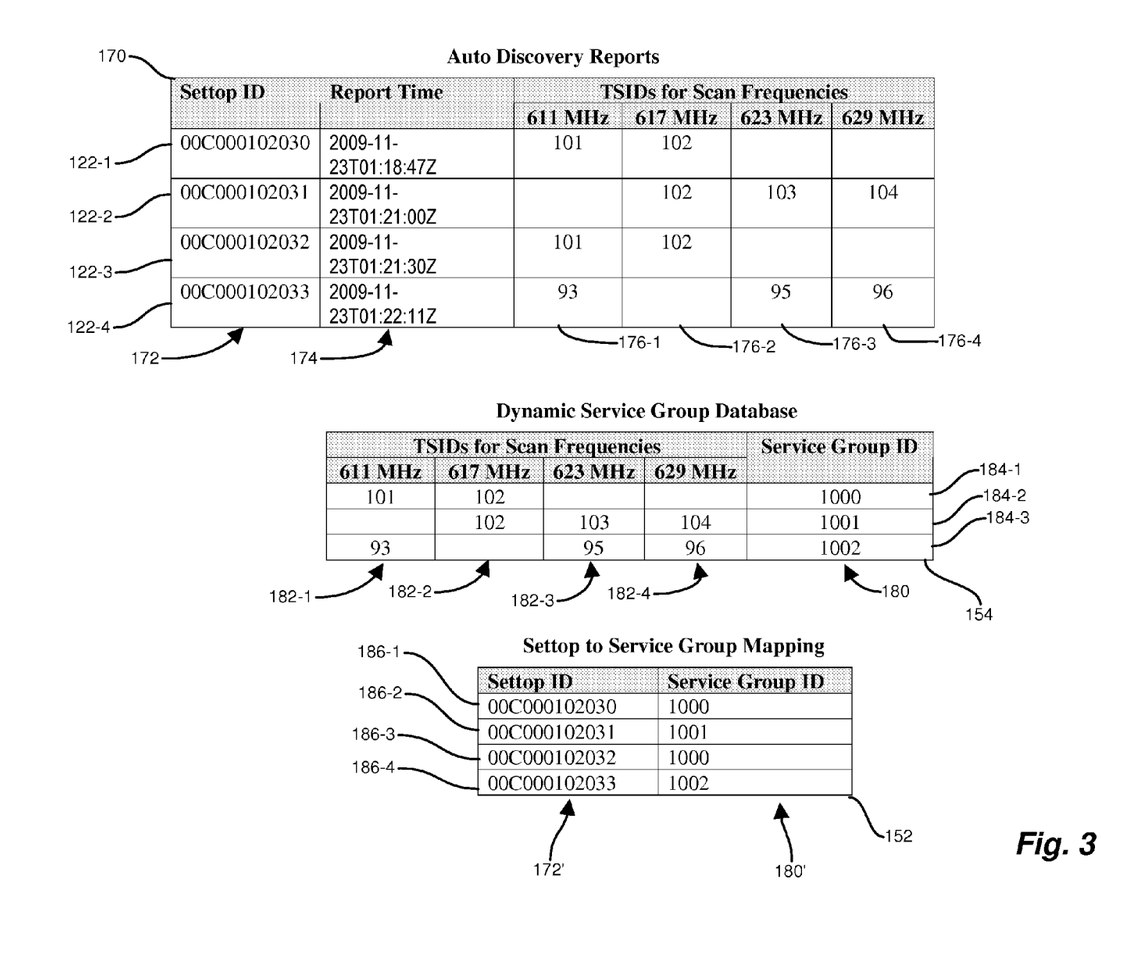
FIG. 3 is a diagram of discovered service groups resulting from the flowchart of FIG. 1.

FIG. 3 is a diagram of discovered service groups resulting from the flowchart of FIG. 1. Referring to FIGS. 1 and 3, a received reports table 170 shows a plurality of reports 122-1 . . . 122-4 (122 generally). Each report 122 includes a settop ID 172, a report time 174, and a scan frequency entry 176-1 . . . 176-4 for each scan frequency recognized by the settop 114 sending the report 122. Each of the scan frequencies 176, in the example shown, corresponds to a stream channel 112, and is indicative of a 6 MHz frequency range corresponding to a TSID for MPEG video encoded in QAM. Alternate frequency ranges may be employed depending on the service required. Typically, each service group 110 is allocated 4, 6, or 8 stream channels (TSIDs, or QAMs) based on expected demand, however the received scan frequencies 176 should not exceed the total allocated to the service group 110. Fewer frequencies may be transmitted if the settop 114 did not have sufficient time or the frequency was noisy and not recognized as usable.

The service group mapping table 154 shows the grouping and combining performed for the received reports 170. As service groups are built from received reports, service group IDs 180 are dynamically generated and assigned stream channels known for that service group 110 by creating service group entries 184-1 . . . 184-3 (184 generally). Reports 122-1 and 122-3 included the same two frequencies (TSIDs 101, 102), thus the discovery server 140 assigned both to service group ID 1000. Reports 122-2 and 122-4 are not exact matches with any other group, thus dynamic service groups IDs 1001 and 1002 were dynamically assigned. It should be noted that report 122-2 included stream channel 102 in common with service group 1000, however, as the aggregation rules discussed below will explain, a single TSID overlap (commonality) is not sufficient to construe common service groups 110 in the present configuration. Alternate aggregation rules 142 may be employed in alternate configurations, such as varying the overlap threshold.

Figure 4:
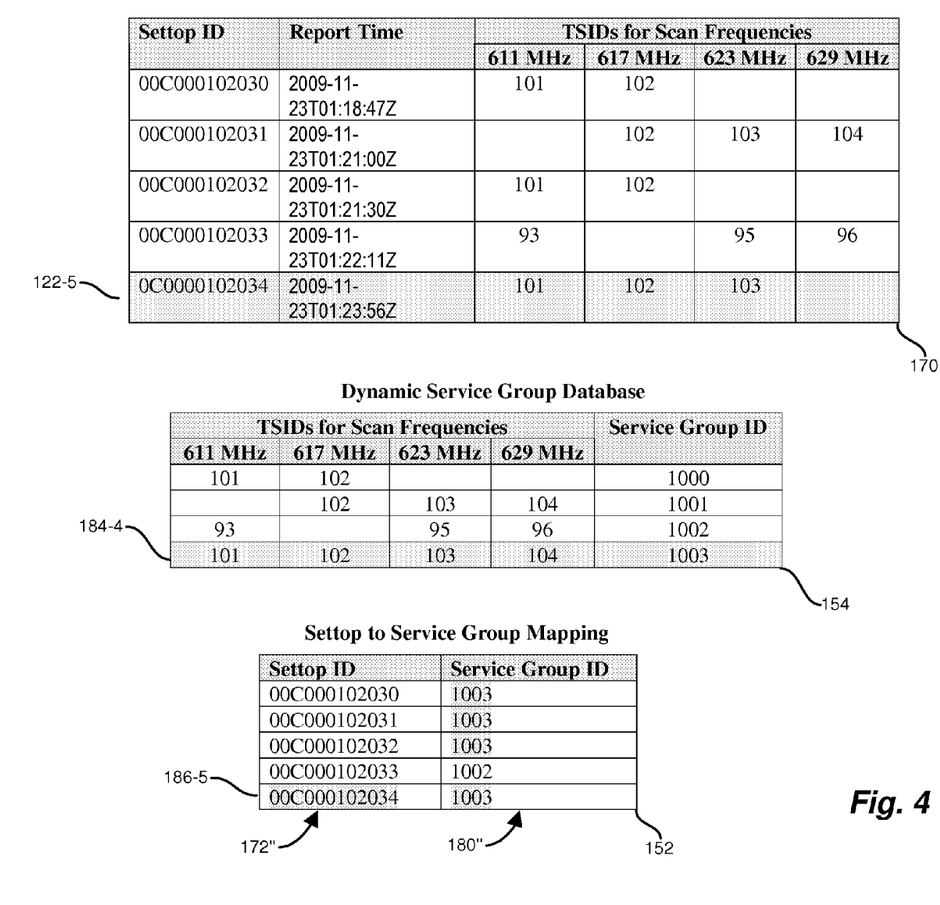
FIG. 4 is a diagram of combining discovered service groups to the arrangement of FIG. 3.
Figure 5:
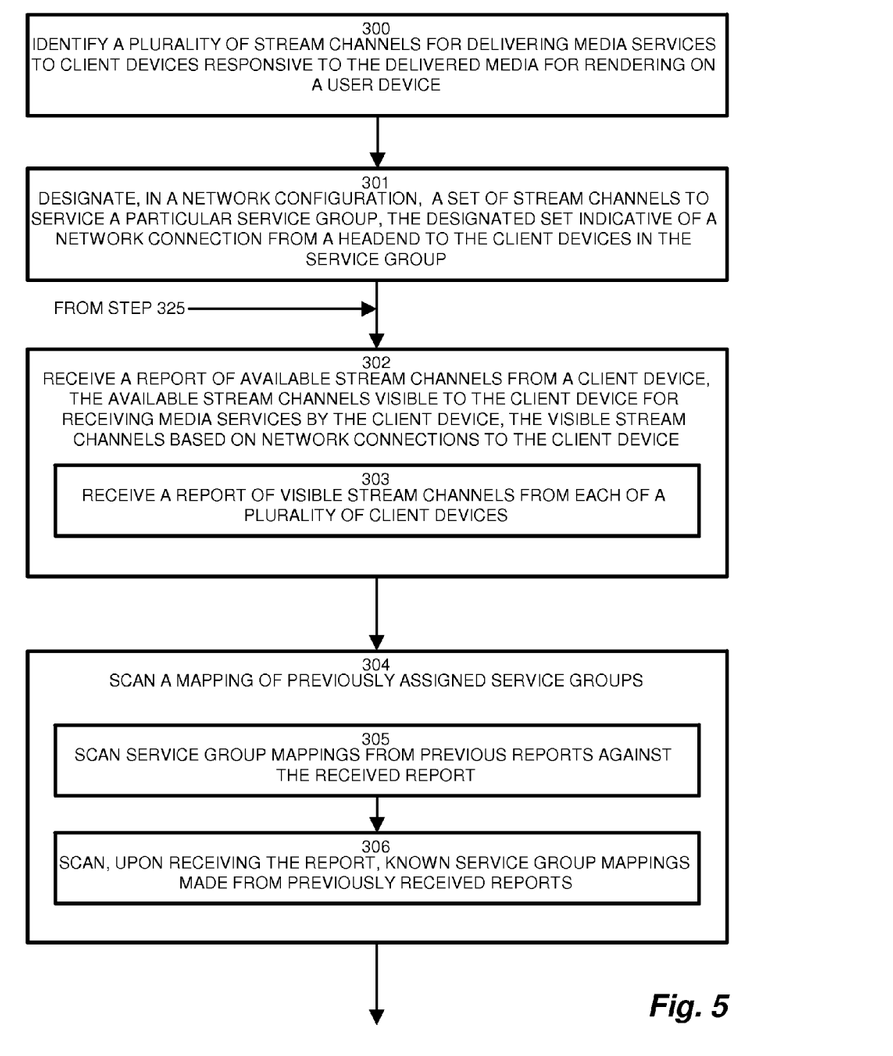
FIGS. 5-8 are a flowchart of aggregation rules for building service groups based on dynamic discovery as disclosed herein.
Figure 6:
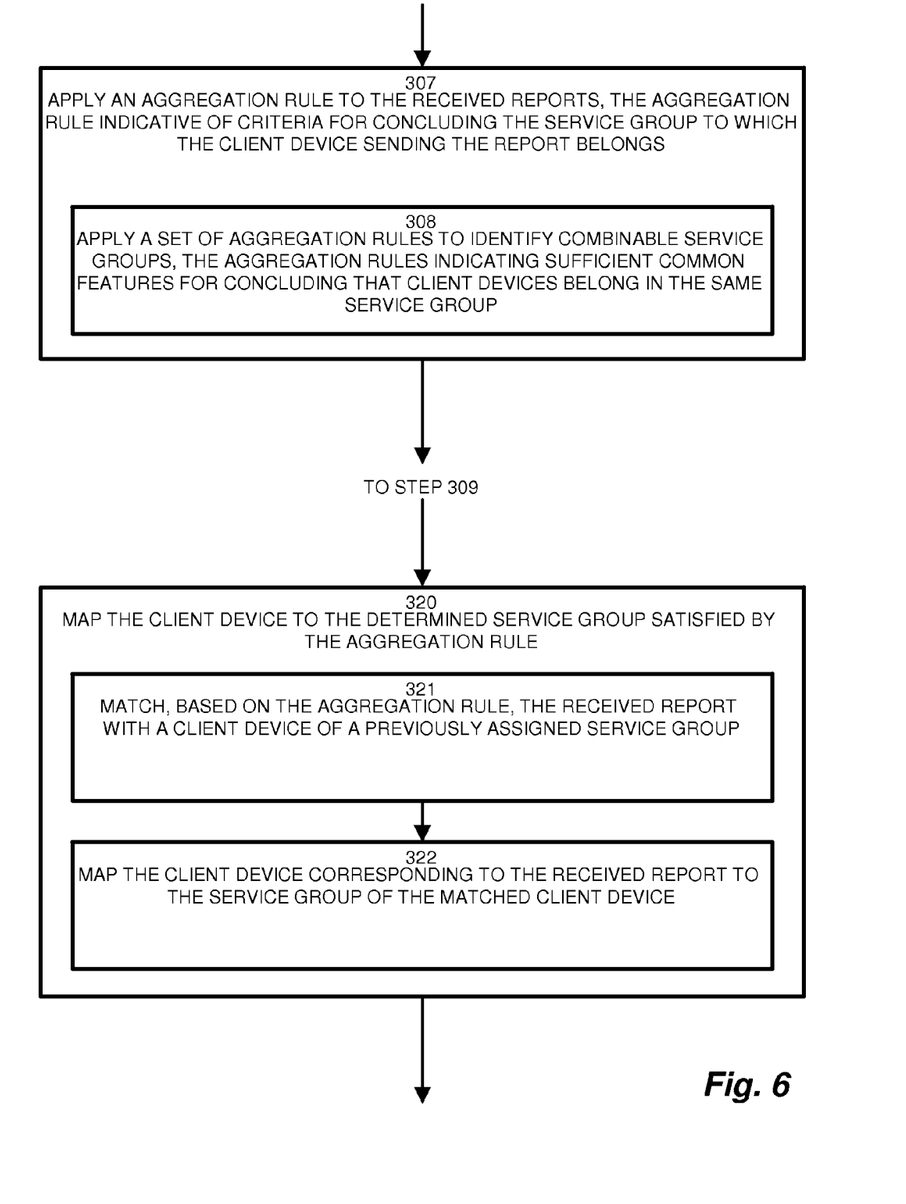
Figure 7:
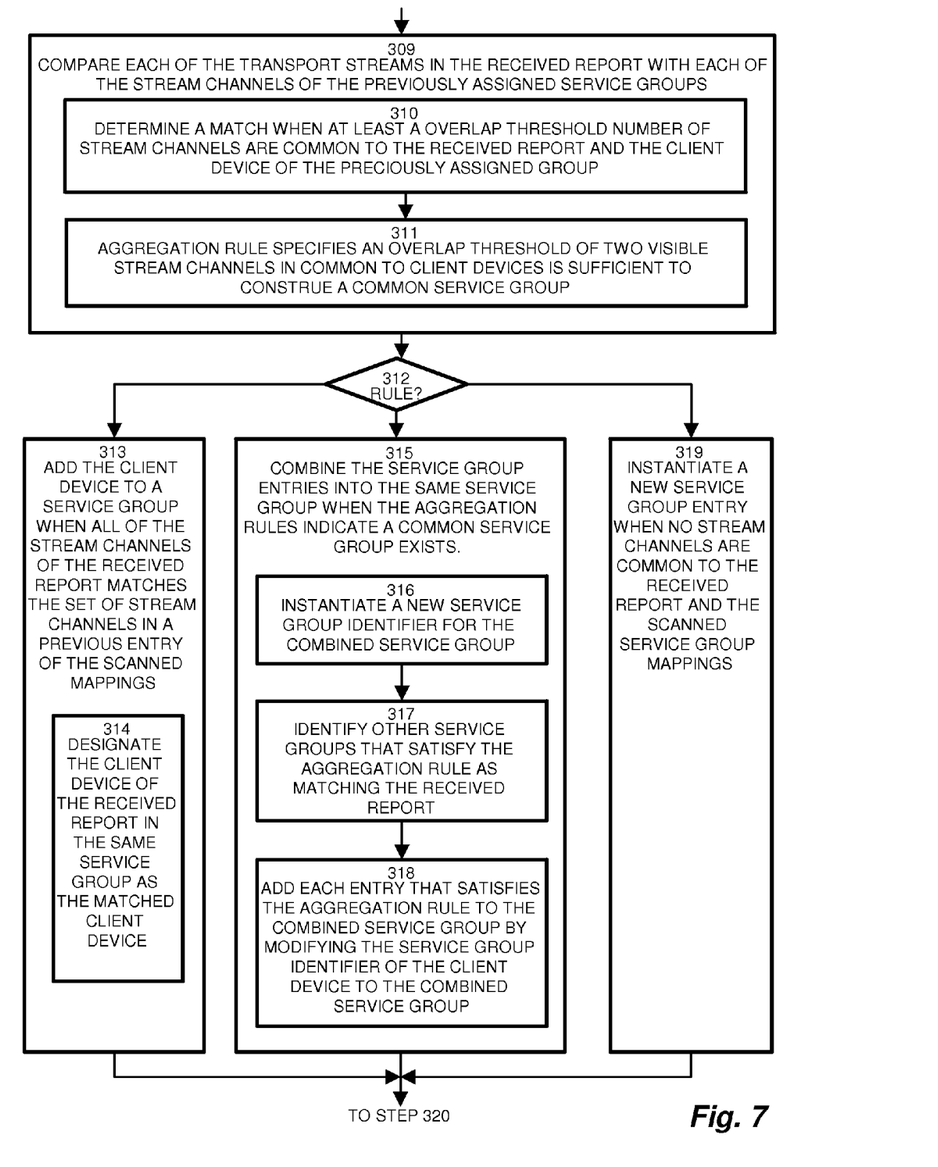
Figure 8:
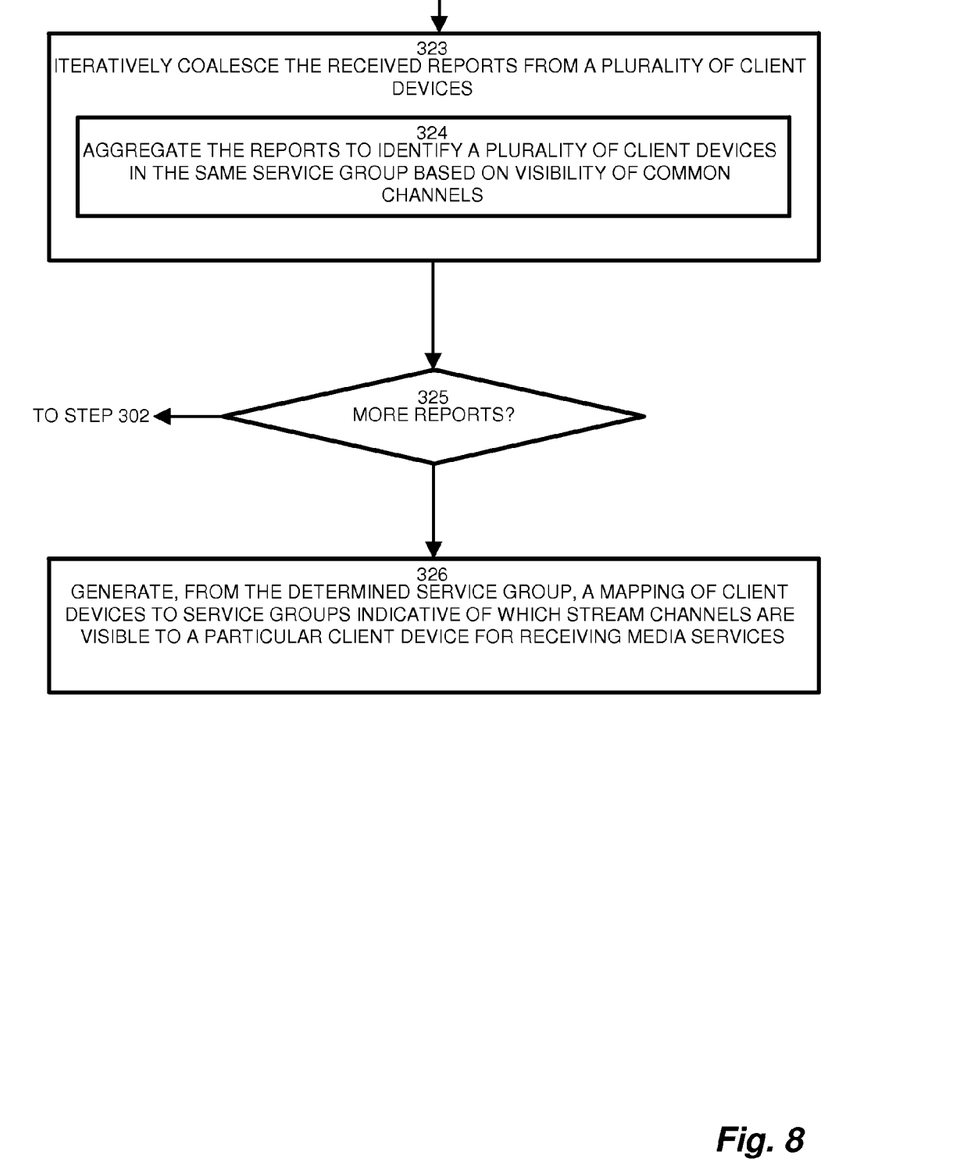

FIG. 4 is a diagram of combining discovered service groups 110 to the arrangement of FIG. 3. Referring to FIGS. 4 and 5, a new report 122-5 arrives from settop ID 0C0000102034, and indicates stream channels of 101, 102, and 103. These values are common to (i.e. overlap) with two values of service group 1000 (101, 102), and two values of service group 1001 (102, 103), shown by entries 184-1 and 184-2. Since the aggregation threshold of two is met, the discovery server 140 combines all entries 184 meeting the threshold are combined by dynamically creating a new entry 184-4 to add service group ID 1003. Each of the entries 186 in the settop mapping 152 formerly identified with service groups 1000 and 1002 combine to map to new group 1003, shown by columns 172" and 180".

FIGS. 5-8 are a flowchart of aggregation rules for building service groups based on dynamic discovery as disclosed herein by applying the aggregation rules 142 to an incoming sequence of reports 122. Referring to FIGS. 1, 3 and 5-8, at step 300, the discovery server 140 identifies a plurality of stream channels 112 for delivering media services 120 to client devices 114 responsive to the delivered media for rendering on a user device 124. A network configuration designates a set of stream channels 112 to service a particular service group 110, such that the designated set is indicative of a network connection 104 from a headend 106 to the client devices 114 in the service group 110, as shown at step 301. Thus, the configuration defines which stream channels 112 are receivable (seen) by each service group 110 and hence, the settops 114 in that service group 110. A video service 120 mapped to the wrong stream channel 112 will result in a failure for the intended settop 114 to receive the intended service 120.

The discovery server 140 receives a report 122 of available stream channels 112 from a client device 114, such that the available stream channels 114 visible to the client device are operable for receiving media services 120 by the client device 114, in which the visible stream channels 112 are based on network connections to the client device 114, as shown at step 302. In the example configuration, the discovery server 140 receives a report 122 of visible stream channels from each of a plurality of client devices 114, as depicted at step 303.

The discovery server 140 determines, from the received report 122, a service group 110 corresponding to the client device 114 sending the report 122, such that the client devices 114 are arranged in service groups 110, and each of the client devices 114 in the service group 110 are responsive to the same set of visible stream channels 112. The discovery server 140 scans a mapping 154 of previously assigned service groups 110, as disclosed at step 304. This includes scanning service group mappings 154 from previous reports 122-1 . . . 122-4 against the received report 122-5, as depicted at step 305, and scanning, upon receiving the report 122, known service group mappings 180 made from the previously received reports 170, as depicted at step 306.

The discovery server 140 applies an aggregation rule 142 to the received reports 122, in which the aggregation rule 142 is indicative of criteria for concluding the service group 110 to which the client device 114 sending the report 122 belongs, as disclosed at step 307. This may include applying a set of aggregation rules 142 to identify combinable service groups 110, such that the aggregation rules 142 indicate sufficient common features for concluding that client devices 114 belong in the same service group 110, as depicted at step 308.

An example aggregation rule identifies common stream channels 112 between settops. Applying the aggregation rules 142 may include comparing each of the transport streams 110 in the received report 122 with each of the stream channels 112 of the previously assigned service groups 110, as depicted at step 309. In the example arrangement, the aggregation rules 142 determines a match when at least an overlap threshold number of stream channels 112 are common to the received report 122 and the client device 114 of the previously assigned groups, as disclosed at step 309. The aggregation rule 142, in the example arrangement, specifies an overlap threshold of two visible stream channels in common to client devices is sufficient to construe a common service group 110, as depicted at step 311. In a noisy system where the reports 122 are more likely to contain inaccuracies, a threshold of 3 may be appropriate. Similarly, in a sufficiently robust reporting, an overlap of 1 may be adequate.

In the example arrangement, the discovery server 140 employs the criteria specified by the aggregation rules 142 to perform a check, as depicted at step 312, to identify complete overlap, threshold overlap, and no overlap. At step 313, the discovery server 140 adds the client device 114 to a service group 110 when all of the stream channels 112 of the received report match the set of stream channels 112 in a previous entry 176 of the scanned mappings, as with entries 122-1 and 122-3. When such a complete match occurs, the discovery server 140 designates the client device 114 of the received report 122 in the same service group 180 as the matched client device or devices 114, as disclosed at step 314.

In the case of a threshold overlap (i.e. 2 groups match, in the disclosed example), the discovery server 140 combines the service group entries 184 into the same service group 1003 when the aggregation rules (i.e. 2 group overlap) indicate a common service group exists, as depicted at step 315. The discovery server 140 instantiates a new service group identifier 1003 for the combined service group 184-4, as shown at step 316. The discovery server 140 identifies other service groups 1000, 1001 that satisfy the aggregation rule as matching the received report 122, as depicted at step 317. The settop mapping 152 then adds each entry 172' that satisfies the aggregation rule to the combined service group 1003 by modifying the service group identifier 180' of the client device 114 to the combined service group (entry 184-4), as disclosed at step 318.

If none of the aggregation rules 142 yield a match with the previous groups (i.e. does not match the threshold number of stream channels 112), then the service group mapping 154 instantiates a new service group entry 184 when no stream channels 114 are common to the received report 122 and the scanned service group mappings 154, as depicted at step 319 and shown in entries 122-4 and 184-3.

As the reports 122 continue arriving from the settops 114, aggregation of service groups will tend to converge toward the complete set of stream channels 112 visible to the service group 110. The evolving discovery DB 150 therefore maintains the service group mapping 152 of the client device 114 to the determined service group 110 satisfied by the aggregation rule 142, as disclosed at step 320. Requests for services are mapped by the discovery server 140 to satisfy requests 158 by identifying the service group 110 of the requesting settop 114. This includes, at step 321 matching, based on the aggregation rules 142, the received report 122 with a client device 114 of a previously assigned service group 110, and mapping the client device 114 corresponding to the received report 122 to the service group 110 of the matched client device 114, as depicted at step 322.

As the reports 122 are received, the discovery server 140 iteratively coalesces the received reports 122 from the plurality of client devices 114, as shown at step 323, and aggregates the reports 122 to identify other client devices 114 in the same service group 110 based on visibility of common channels 112, as shown at step 324. A check is performed, at step 325, to identify if reports 122 are still being received from settops 114, and control reverts to step 302 to process additional reports 122. Completion is marked by the generation of the mapping (discovery DB 150) of client devices 114 to service groups 110 indicative of which stream channels 112 are visible to a particular client device for receiving media services 120, as depicted at step 326.

Those skilled in the art should readily appreciate that the programs and methods for dynamic service group discovery as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of dynamic service group discovery has been particularly shown and described with references to embodiments thereof, it will be understood by those skilled in the art that various changes in form and details may be made therein without departing from the scope of the invention encompassed by the appended claims.

What is claimed is:

1. In a video delivery system having a plurality of stream channels for delivering media services to client devices responsive to the delivered media for rendering on a user device, a method of discovering transmission resources comprising:
   receiving a report of available stream channels from a client device, the available stream channels visible to the client device for receiving media services by the client device, the visible stream channels based on network connections to the client device;
   determining, from the received report, a service group corresponding to the client device sending the report, the client devices arranged in service groups, each of the client devices in the service group responsive to two or more of the same visible stream channels, wherein the report of available stream channels from the client device does not include all of the stream channels allocated to the service group; and
   generating, from the determined service group, a mapping of client devices to service groups indicative of which stream channels are visible to a particular client device for receiving media services on, wherein the video delivery system does not have a predetermined stream channel to service group mapping.

2. The method of claim 1 further comprising:
   receiving a second report from a second client device;
   identifying, from the stream channels in the second report, a matching stream channel in the mapping; and
   designating the second client device as a member of the service group corresponding to the matching stream channel.

3. The method of claim 2 further comprising:
   iteratively coalescing the received reports from a plurality of client devices, and
   aggregating the reports to identify a plurality of client devices in the same service group based on visibility of common channels.

4. The method of claim 1 further comprising:
   computing, from the received report, other client devices having at least one available stream channel in common with the received report;
   concluding, based on the common stream channel, that the client device and the other client devices are in the same service group; and
   mapping the client device of the received report to the same service group.

5. The method of claim 4 further comprising:
   designating, in a network configuration, a set of stream channels to service a particular service group, the designated set indicative of a network connection from a headend to the client devices in the service group.

6. The method of claim 1 further comprising:
   receiving a report of visible stream channels from each of a plurality of client devices;
   applying an aggregation rule to the received reports, the aggregation rule indicative of criteria for concluding the service group to which the client device sending the report belongs; and
   mapping the client device to the determined service group satisfied by the aggregation rule.

7. The method of claim 6 further comprising:
   scanning, upon receiving the report, known service group mappings made from previously received reports; and
   applying a set of aggregation rules to identify combinable service groups, the aggregation rules indicating sufficient common features for concluding that client devices belong in the same service group.

8. The method of claim 6 further comprising:
   scanning a mapping of previously assigned service groups;
   matching, based on the aggregation rule, the received report with a client device of a previously assigned service group; and
   mapping the client device corresponding to the received report to the service group of the matched client device.

9. The method of claim 6 wherein applying the aggregation rule further comprises:
   comparing each of the transport streams in the received report with each of the stream channels of the previously assigned service groups;
   determining a match when at least an overlap threshold number of stream channels are common to the received report and the client device of the previously assigned group; and
   designating the client device of the received report in the same service group as the matched client device.

10. The method of claim 9 wherein the aggregation rule specifies an overlap threshold of two visible stream channels in common to client devices is sufficient to construe a common service group.

11. The method of claim 1 further comprising:
    scanning service group mappings from previous reports against the received report and instantiating a new service group entry when no stream channels are common to the received report and the scanned service group mappings;
    adding the client device to a service group when all of the stream channels of the received report matches the set of stream channels in a previous entry of the scanned mappings; and
    combining the service group entries into the same service group when aggregation rules indicate a common service group exists.

12. The method of claim 11 wherein combining further comprises:
    instantiating a new service group identifier for the combined service group;
    identifying other service groups that satisfy the aggregation rule as matching the received report; and
    adding each entry that satisfies the aggregation rule to the combined service group by modifying the service group identifier of the client device to the combined service group.

13. An automatic discovery server for discovering transmission resources comprising:
    a discovery interface to an infrastructure network for receiving a report of available stream channels from a client device, the available stream channels visible to the client device for receiving media services by the client device, the visible stream channels based on network connections to the client device;

a set of aggregation rules for determining, from the received report, a service group corresponding to the client device sending the report, client devices arranged in service groups, each of the client devices in the service group responsive to two or more of the same visible stream channels, wherein the received report of available stream channels from the client device does not include all of the stream channels allocated to the service group; and a settop mapping table having a mapping of the client devices to the service groups indicative of stream channels visible to a particular client device for receiving media services, and a service group mapping indicative of stream channels corresponding to the service group, generated from the determined service group, wherein the settop mapping table does include a predetermined stream channel to service group mapping.

14. The server of claim 13 wherein the discovery server is further configured to:

compute, from the received report, other client devices having at least one available stream channel in common with the received report;

conclude, based on the common stream channel, that the client device and the other client devices are in the same service group; and map, in the settop mapping table, the client device of the received report to the same service group.

15. The server of claim 14 further comprising a network configuration designating a set of stream channels coupled to service a particular service group, the designated set indicative of a network connection from a headend to the client devices in the service group.

16. The server of claim 13 wherein the discovery interface is configured to receive other reports of visible stream channels from each of a plurality of client devices, the aggregation rules for applying an aggregation rule to the received other reports, the aggregation rule indicative of criteria for concluding the service group to which each of a plurality of client devices belongs, further comprising a discovery database for storing the mapping of the client device to the determined service group satisfied by the aggregation rule.

17. The server of claim 16 wherein the discovery server is further configured to:

scan, upon receiving the other reports, known service group mappings made from previously received reports; and apply a set of aggregation rules to identify combinable service groups, the aggregation rules indicating sufficient common features for concluding that client devices belong in the same service group.

18. The server of claim 16 wherein the discovery server is further configured to:

scan a mapping of previously assigned service groups;

match, based on the aggregation rule, each of the other reports with a client device of a previously assigned service group; and map each of the plurality of client devices corresponding to each of the other reports to the service group of the matched client device.

19. The server of claim 16 wherein the discovery server is configured to apply the aggregation rule by:

comparing each of the transport streams in the received report with each of the stream channels of the previously assigned service groups;

determining a match when at least an overlap threshold number of stream channels are common to the received report and the client device of the previously assigned group; and designating the client device of the received report in the same service group as the matched client device, wherein the aggregation rule specifies an overlap threshold of two visible stream channels in common to client devices is sufficient to construe a common service group.

20. The server of claim 13 wherein the discovery server is configured to:

scan service group mappings from previous reports against the received report;

instantiate a new service group entry when no stream channels are common to the received report and the scanned service group mappings;

add the client device to a service group when all of the stream channels of the received report matches the set of stream channels in a previous entry of the scanned mappings; and combine the service group entries into the same service group when the aggregation rules indicate a common service group exists.

21. The server of claim 20 wherein the discovery server is configured to combine the service groups by:

instantiating a new service group identifier for the combined service group;

identifying other service groups that satisfy the aggregation rule as matching the received report; and adding each entry that satisfies the aggregation rule to the combined service group by modifying the service group identifier of the client device to the combined service group.

22. A computer program product having an encoded set of processor based instructions on a non-transitory computer readable storage medium for performing a method of discovering transmission resources in a video services system having a plurality of stream channels for delivering media services to client devices responsive to the delivered media for rendering on a user device, the method comprising:

receiving a report of available stream channels from a client device, the available stream channels visible to the client device for receiving media services by the client device, the visible stream channels based on network connections to the client device;

determining, from the received report, a service group corresponding to the client device sending the report, the client devices arranged in service groups, each of the client devices in the service group responsive to two or more of the same visible stream channels, wherein the received report of available stream channels from the client device does not include all of the stream channels allocated to the service group; and generating, from the determined service group, a mapping of client devices to service groups indicative of which stream channels are visible to a particular client device for receiving media services on, wherein the video delivery system does not have a predetermined stream channel to service group mapping.

* * * * *